No. 892,724. PATENTED JULY 7, 1908.
A. W. HEWITT.
TYPE WRITING MACHINE.
APPLICATION FILED MAY 18, 1906.

WITNESSES:
D. A. Carpenter
E. M. Wells

INVENTOR.
Allin W. Hewitt
By Jacob Felbel
HIS ATTORNEY No. 892,724.

PATENTED JULY 7, 1908.

A. W. HEWITT.
TYPE WRITING MACHINE.
APPLICATION FILED MAY 18, 1906.

WITNESSES.
D. A. Carpenter
E. M. Wells

INVENTOR.
Allen W. Hewitt
By Jacob Felbel
HIS ATTORNEY

No. 892,724.

A. W. HEWITT.
TYPE WRITING MACHINE.
APPLICATION FILED MAY 18, 1906.

PATENTED JULY 7, 1908.

WITNESSES.
D. A. Carpenter.
E. M. Wells.

INVENTOR.
Allin W. Hewitt
By Jacob Felbel
HIS ATTORNEY

UNITED STATES PATENT OFFICE.

ALLIN W. HEWITT, OF BOGOTA, NEW JERSEY, ASSIGNOR TO WYCKOFF, SEAMANS & BENEDICT, OF ILION, NEW YORK, A CORPORATION OF NEW YORK.

TYPE-WRITING MACHINE.

No. 892,724.　　　　Specification of Letters Patent.　　　Patented July 7, 1908.

Application filed May 18, 1906. Serial No. 317,489.

*To all whom it may concern:*

Be it known that I, ALLIN W. HEWITT, citizen of the United States, and resident of Bogota, in the county of Bergen and State of New Jersey, have invented certain new and useful Improvements in Type-Writing Machines, of which the following is a specification.

This invention relates to improvements in mechanism which is connected with the platen of typewriting machines and which facilitates imparting movements to the platen which are different from the ordinary line spacing movements.

The invention consists of the features of construction, combinations and arrangements of parts which are hereinafter described and specified in the claims.

In the accompanying drawings.

The invention is applicable to all of the well known typewriting machines which contain a rotary platen. It is shown embodied in mechanism which is especially useful in doing billing-work, but it may be used for several purposes as will be hereinafter explained. The particular mechanism illustrated in Figs. 1 et seq. to 5, inclusive, of the drawings will first be described.

Figure 1:
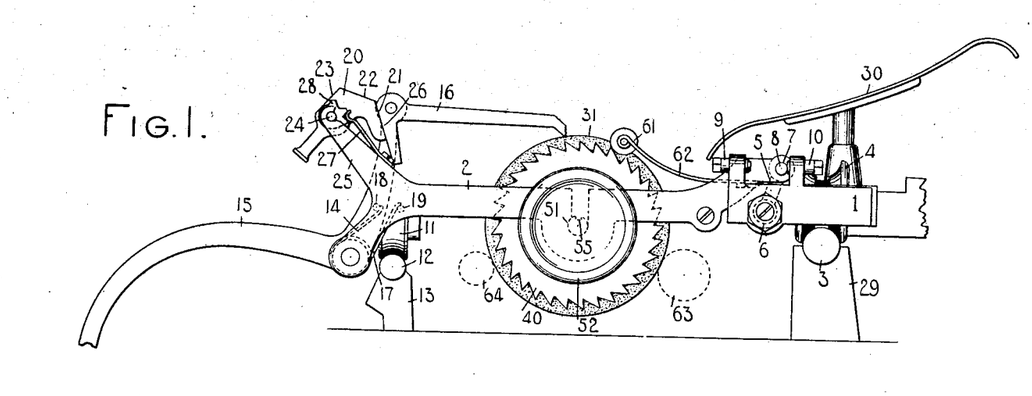
Figure 1 is an end view of the platen and platen carriage of a Remington machine to which the invention is applied.

The truck 1 and platen frame 2 are well known parts of the Remington machine, the truck being mounted on a cross rod 3 on which it is supported by means of rollers or wheels 4 having bearings on the truck. The platen frame is hinged to the truck by links 5 formed on or fixed to a rock shaft 6 and pivoted to the rear of the platen frame at 7, the rock shaft having bearings at its ends on the ends of the truck 1. On the ends of the carriage are projections 8 which extend between stops 9 and 10 formed on the truck at each end, these stops and projections serving to limit the movement of the platen, when it is shifted to provide for printing upper and lower case characters. On the front of the carriage frame is mounted a grooved roller 11 which normally rests on a shift-rod 12, this rod being movable on arms 13 toward and from the front of the machine for the purpose of shifting the platen. On an arm 14 formed on the right end of the platen frame is pivoted a line spacing lever 15 on which is mounted a line spacing pawl 16. A spring 17, coiled about the pivot of the lever 15 and bearing at its ends on pins 18 and 19 fixed in the lever and platen frame respectively, tends to hold the lever in its normal position. A stop 20 having faces 21, 22 and 23 is pivoted by a pin 24 on an arm 25 formed on the platen frame, this stop bearing against the surface 26 on the pawls 16 and serving to limit the forward movement of the pawl. The stop 20 is movable on its pivotal axis to bring any of the faces 21, 22 or 23 into contact with the face 26 of the pawl to render the pawl movable different distances by the line spacing lever 15 so that a single or double or triple line-space movement may be imparted to the platen by actuating the line-space lever. The stop 20 is held in the position in which it is set by a spring 27 fastened to the arm 25 and bearing on a notched hub or boss 28 formed on or affixed to the stop 20. The cross rod 3 is supported by and fastened to posts 29 which are formed on the top plate of the machine, and on the truck is mounted a paper support 30. All the mechanism thus far described is to be found in the well known Remington machine, and its operation will be understood.

Figure 2:
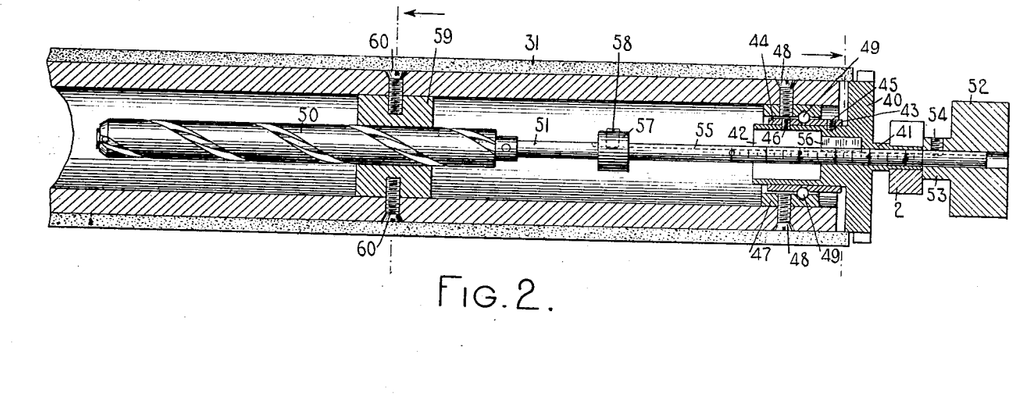
Fig. 2, a longitudinal section of a portion of the platen, the line spacing wheel and right end of the platen frame, and a side view of a screw within the platen and other devices forming part of the mechanism of the invention.
Figures 3, 4, 5, 6, 7:
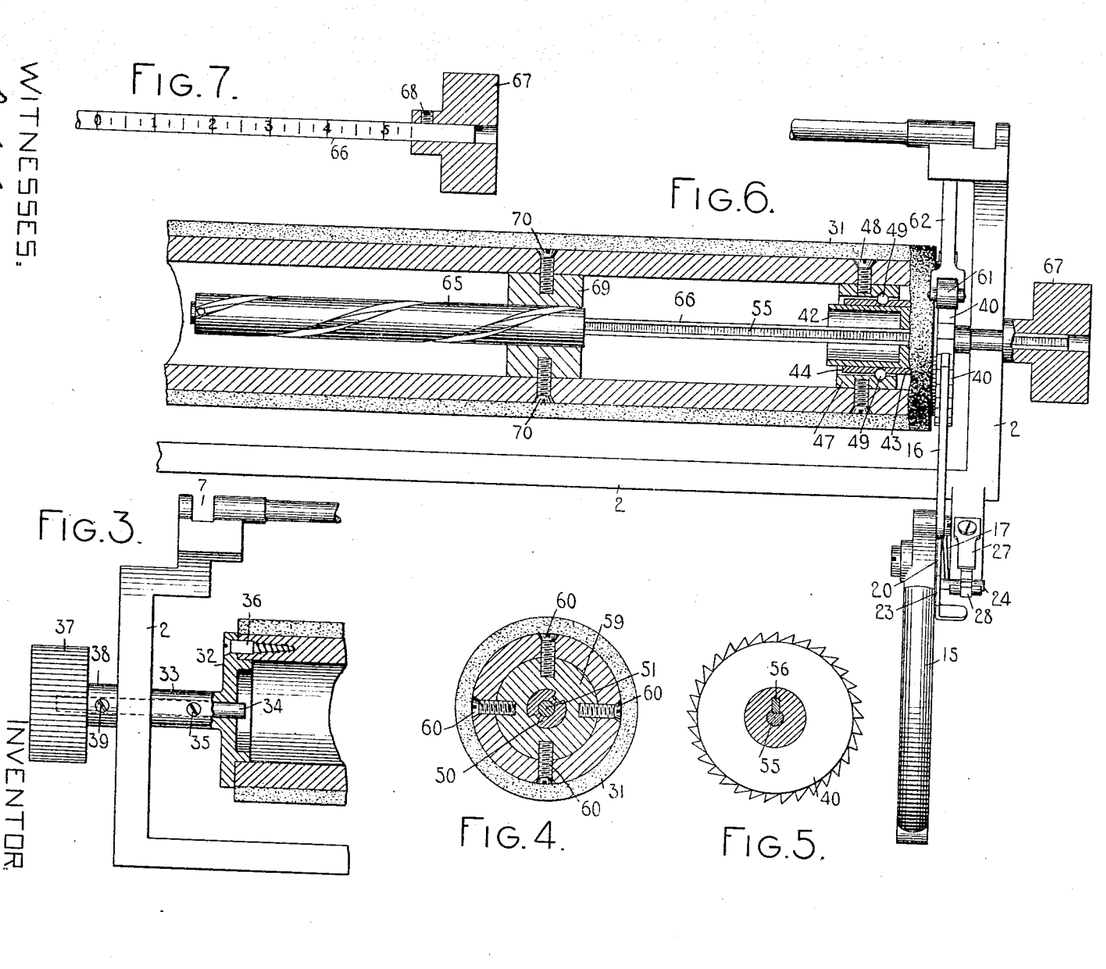
Fig. 3, a top view of the left end of the platen frame, and a longitudinal section of a fragment of the platen.
Fig. 4, a cross section of the platen, screw and counterpart of the screw.
Fig. 5, a cross section of the parts shown in Fig. 2 on the section line near the right of this figure, the section being viewed in the direction indicated by the arrow.
Fig. 6, a top view of a portion of the platen frame of a Remington machine, a longitudinal section of a fragment of the platen, and a side or top view of a screw and other coöperative devices, this being a left-hand screw.
Fig. 7, a detail of the shaft and finger wheel shown in Fig. 6, the finger wheel being shown in cross section.

The platen 31 is supported at its left end by a head 32 having on it a tubular hub 33, and by a short rod 34 extending through the hub 33 and the left end of the platen frame, the hub being affixed to the shaft 34 by a set screw 35. The head 32 is fastened to the end of the platen by screws 36. On the shaft 34 outside of the platen frame is a finger wheel 37 having on it a hub 38 which fits on the shaft 34 and is affixed thereto by a set screw 39. At the right end of the platen is a line spacing wheel 40 having a hollow hub 41 which fits in the right end of the platen frame 2 and forms a journal for the line spacing wheel and platen. On the inner face of the line spacing wheel is formed a tubular hub 42, on which rings 43 and 44 are fastened by screws 45 and 46 respectively, which pass through the rings into the hub 42, these rings forming at their inner edges a portion of a ball race. A ring 47 is fastened in the platen by screws 48 and in this ring is a groove which forms the rest of the ball race mentioned, and the ball race contains a set of balls 49. The parts just described form a ball bearing for the right end of the platen, and the platen may be turned in either direction on this bearing when the line spacing wheel is at rest.

Within the platen is a screw 50 which is shown in the form of a spirally grooved cylinder, but which might have a spiral rib formed on it instead of the groove, and this screw is affixed to a shaft 51 which extends through the line spacing wheel 40 and the right end of the platen frame, passing through the hubs 41 and 42 of the line spacing wheel, and on the outer end of this shaft is a finger wheel 52. The axis of the screw 50 and that of the shaft 51 coincide with the axis of the platen. In the hub 53 of the finger wheel 52 is a set screw 54, by means of which the finger wheel may be fastened to the shaft 51, along which the finger wheel is adjustable. This shaft has in it a groove 55, and in the line spacing wheel is a feather 56 which is fast in the wheel and extends into the groove 55. On the front side of this shaft are straight marks or cuts and the numerals "0", "1", "2", "3", "4" and "5" forming a scale. A collar 57 is mounted on the shaft 51 within the platen and is attached to the shaft by a set screw 58 so that the position of the collar may be changed if desired. The screw 50 passes through and engages with a block or counterpart 59, which is secured in the platen about midway between its ends by screws 60. A spring-pressed roller or detent 61, the spring 62 of which is fastened at its rear end to the platen frame, normally engages the line spacing wheel 40 and tends to prevent it from turning on its axis. The construction described is such that when the line spacing wheel is held by the detent, and the shaft 51 and the screw 50, which it will be understood are axially movable, are drawn toward the right by the hand of the operator grasping the finger wheel 52, the platen will be rotated by the action of the screw on its counterpart 59, the shaft 51 being prevented from turning on its axis by the feather 56 fitting in the groove 55. The screw 50 being a right-hand screw the platen will obviously be rotated forwardly when the shaft and screw are drawn toward the right, and the platen may be actuated in this direction as described until the collar 57 is brought into contact with the inner face of the line spacing wheel 40, when the platen will be arrested. By pushing the shaft and screw inward the platen may be rotated in the opposite direction or backwardly until the hub 53 of the finger wheel 52 meets the platen frame 2, or the outer end of the hub 41 of the line spacing wheel. The collar or stop 57 is so located on the shaft 51 that when the right face of the collar is in contact with the inner face of the line spacing wheel the scale mark "0" on the shaft is even with the outer face of the platen frame. The scale marks shown are so arranged that if the mark "0" is even with the right face of the platen frame and the shaft and screw are then pushed inward, a point on the surface of the platen will be moved backward one inch when the scale mark "1" is even with the right face of the platen frame, and two, three, four or five inches respectively when the scale mark "2", "3", "4" or "5" is even with the right face of the platen frame. The paper is fed into the machine by the co-action of the platen with the usual feed rolls 63, shown in dotted lines in Fig. 1, and is pressed against the front of the platen by rolls 64 as it passes through the machine. If, therefore, bill-sheets or letter-sheets are to be used on which it is desired to write the first line when the sheets have been fed into the machine three inches, for example, the shaft 51 and screw 50 are first drawn outward until the scale-numeral "3" is even with the right face of the platen frame, and then a sheet is inserted in the machine and the shaft and screw are further drawn outward until the stop 57 arrests the platen. By this means the sheet is fed into the machine the desired distance. After entries have been made on a sheet the platen may be rotated backwardly the desired distance to provide for inserting another sheet, by pushing inward the shaft 51 and screw 50 until the scale numeral "3" is even with the right face of the platen frame. Then another sheet may be inserted in the machine and fed forward the desired distance by pulling outward the shaft and screw until the forward movement of the platen is arrested by the action of the stop 57 on the inner face of the line spacing-wheel. If the finger wheel 52 is so adjusted on the shaft 51 that the left end of the hub 53 registers with the scale mark "3" on the shaft, then when the shaft and screw are pushed inward as described, the backward movement of the platen will be terminated by the action of the hub or stop 53 against the platen frame, when the platen has been turned to the desired extent.

As the platen is rotated in either direction by actuating the shaft 51 the right end of the platen turns on the ball bearing which has been described above and which includes the balls 49 and the platen therefore rotated independently of the line spacing wheel. When the line spacing lever 15 is actuated the pawl 16 engages a tooth of the line spacing-wheel 40 and this wheel is turned, the shaft 51 being turned with it through the action on the shaft of the feather 56, and the platen is also turned through the action of the screw 50 on its counterpart 59 fixed in the platen. When the finger wheel 37 is turned, the platen, the screw 50, shaft 51, and line spacing-wheel 40 are turned together, motion being imparted to the screw by the action thereon of its counterpart 59, and from the screw to the shaft and line-spacing wheel. The platen, line spacing wheel, shaft and screw may also be rotated in either direction by turning the finger wheel 52, motion then being imparted to the platen by the action of the screw on its counterpart 59. It will be understood that the scale marks described may be arranged to indicate line space movements instead of inches, so that when the shaft 51 and the screw 50 are moved axially as described a movement equivalent to a line space movement, or a plurality of line space movements, will be imparted to the platen when the shaft is drawn outward or pushed inward a distance equal to that between two scale marks.

The construction illustrated in Fig. 6 of the drawings is similar to that above described except that the screw is a left-hand instead of a right-hand screw, and the pitch of this screw differs from that of the screw 50 shown in Fig. 2. The platen frame 2, line spacing lever 15, pawl 16, stop 20, platen 31, line spacing wheel 40 and spring detent 61, 62, are the same as the corresponding parts shown in Figs. 1 and 2 and above described. The ball bearing at the right end of the platen is also the same as the ball bearing which has been described above. The screw 65 is mounted on a shaft 66 which extends through the line spacing wheel and platen frame and on which is a finger wheel 67, having in its hub a set screw 68, by means of which it may be fastened to the shaft 66 in different positions. The screw 65 fits in and engages with a counterpart 69 which is fixed in the platen by means of screws 70. When the shaft 66 and screw 65 are moved axially the platen is rotated by the action of the screw on its counterpart 69, but in this case the platen is turned backward when the shaft and screw are drawn toward the right, and is turned forward when the screw and shaft are pushed inward. Therefore when a sheet of paper has been fed into the machine and entries are being made on the paper the finger wheel 67 is close to the right end of the platen frame, instead of at a considerable distance from it as is the finger wheel 52 of the construction shown in Fig. 2 under similar conditions. The shaft 66 may be drawn outward until the right end of the screw 65 meets the inner face of the line space wheel, and it is therefore not necessary to put on this shaft a stop collar like the collar 57, the screw itself performing the function of such a stop. The action of this construction will be understood, it is believed, from the foregoing description of the construction and operation of the mechanism shown in Figs. 1 to 5.

Figure 8:
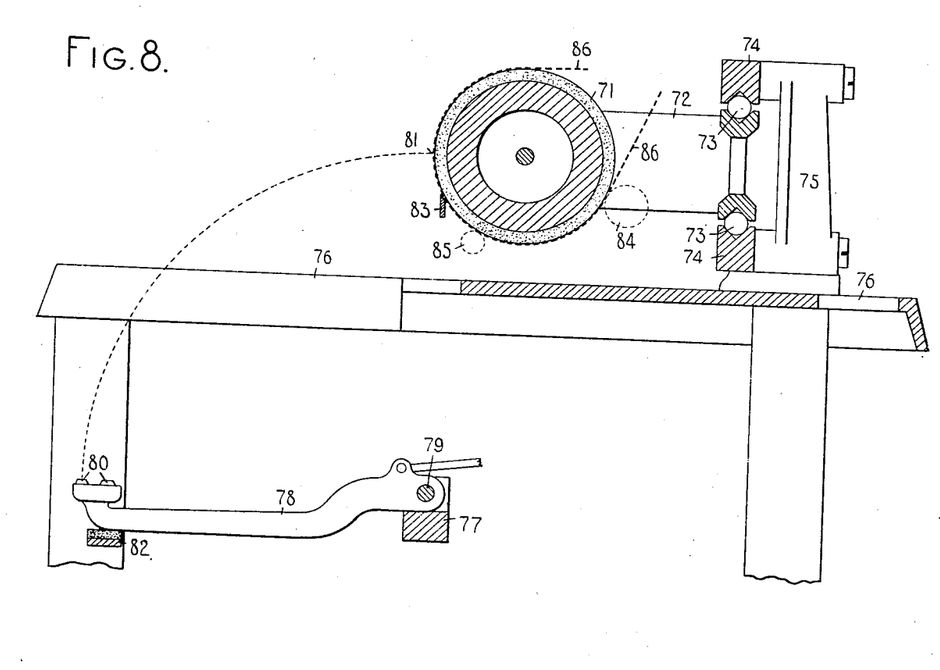
Fig. 8, a vertical section at right angles to the axis of the platen, of parts of a "visible-writing" machine, illustrating a way in which the invention may be utilized.

The invention may also be utilized for imparting variable line space movements to the platen as well as for use in doing condensed billing. By actuating the screw the platen may be rotated any fractional part of a line space or of several line spaces, while the line-spacing wheel is at rest, and thereafter the platen may be actuated in the usual way by operating the line spacing lever. The invention may also be utilized to facilitate making corrections in writing done on visible-writing machines, such, for example, as a Monarch machine, of which parts are shown in Fig. 8 of the drawings. The platen 71 of this machine is supported in a frame 72 mounted on balls 73, which travel in guides 74 affixed to standards 75 which are fast on the top plate 76 of the machine frame. The type bars are pivotally mounted on a type bar segment 77, each type bar 78 being arranged to swing on its pivotal axis 79 so that each of the type 80 on the bar may be made to act against the front of the platen at the printing point 81. The curved dotted line extending from the front type on the type bar shown to the platen indicates the path in which the type travels when the type bar is actuated to print with this type. The type bars normally rest at their front ends on a type bar rest 82. The common scale bar 83 is shown in cross section and paper feed rollers 84 and pressure rollers 85 are indicated in dotted lines. A heavy dotted line 86 represents a sheet of paper in the machine. When a correction is to be made in writing done on this machine it is desirable to turn the platen forward, supposing the printed letter is either on a horizontal line containing the printing point 81 or close to the edge of the scale 83, far enough to bring the letter to be erased to the top of the platen, and then after the letter has been erased to turn the platen backward so as to bring the space which the letter occupied to the line containing the printing point, so that the proper letter may be written. From the foregoing description of the invention it will be seen that it may be applied to this visible writing machine, and that the adjustable finger wheel may be so arranged on the axially movable shaft as to enable the platen to be rotated for the purpose just described by actuating the finger wheel, and to cause the platen to be arrested by one stop when it has been rotated forward the desired distance, and to be arrested by the other stop when it has been rotated backward so that the space to be filled is on a horizontal line passing through the printing point.

The invention may be embodied in mechanism differing in various respects from that shown and particularly described herein, especially in details of construction and arrangement of parts, and it is therefore intended to claim the invention as broadly as it may be proper to claim it in view of the prior state of the art.

What I claim as new and desire to secure by Letters Patent, is:—

1. In a typewriting machine, the combination with the platen, of an axially movable screw having hand actuated means arranged outside of the platen for controlling the axial movement of the screw, and means coöperative with said screw to turn the platen.

2. In a typewriting machine, the combination with the platen, of an axially movable screw and means coöperative therewith to turn the platen in both directions.

3. In a typewriting machine, the combination with the platen, of an axially movable screw within the platen, said screw having hand-actuated means arranged outside of the platen and mechanism coöperative with the screw to turn the platen.

4. In a typewriting machine, the combination with the platen, of an axially movable screw within the platen, a counterpart affixed to the platen and engaging the screw, and actuating means including a part connected with the screw and extending outside of the platen.

5. In a typewriting machine, the combination with the platen, of an axially movable screw within the platen and mechanism coöperative with the screw to turn the platen, said mechanism comprising a shaft connected with the screw and extending outside of the platen.

6. In a typewriting machine, the combination with the platen, of an axially movable screw within the platen and mechanism coöperative with the screw to turn the platen, said mechanism comprising a shaft connected with the screw and extending outside of the platen, the axes of the screw and shaft coinciding with that of the platen.

7. In a typewriting machine, the combination with the platen, of an axially movable screw within the platen, a counterpart affixed to the platen and engaging the screw, and actuating means including a shaft with a finger wheel thereon, the shaft being connected with the screw and extending outside of the platen.

8. In a typewriting machine, the combination with the platen, of an axially movable screw within the platen, a counterpart affixed to the platen and engaging the screw, and actuating means including a shaft with a finger wheel thereon, the shaft being connected with the screw and extending outside of the platen, and the axes of the screw and shaft coinciding with that of the platen.

9. In a typewriting machine, the combination with the platen, of an axially movable screw within the platen, and mechanism coöperative with the screw to turn the platen, said mechanism comprising a shaft, and means tending to prevent the shaft from turning on its axis, said shaft being connected with the screw and extending outside of the platen.

10. In a typewriting machine, the combination with the platen, of an axially movable screw within the platen, and mechanism coöperative with the screw to turn the platen, said mechanism comprising a grooved shaft and a feather tending to prevent the shaft from turning on its axis, said shaft being connected with the screw and extending outside of the platen.

11. In a typewriting machine, the combination with the platen, of a screw within the platen and mechanism coöperative with the screw to turn the platen, said mechanism comprising a shaft connected with the screw and extending outside of the platen, the axes of the screw and shaft coinciding with that of the platen.

12. In a typewriting machine, the combination with the platen and a line-spacing wheel operative to rotate the platen, of a screw within the platen and mechanism coöperative with the screw to turn the platen while the line-spacing wheel is at rest, said mechanism comprising a shaft connected with the screw and extending outside of the platen, the axes of the screw and shaft coinciding with that of the platen.

13. In a typewriting machine, the combination with the platen and a line-spacing wheel operative to rotate the platen, of a screw within the platen and mechanism coöperative with the screw to turn the platen while the line-spacing wheel is at rest, said mechanism comprising a shaft connected with the screw and extending through the line-spacing wheel.

14. In a typewriting machine, the combination with the platen and a line-spacing wheel operative to rotate the platen, of a screw within the platen and mechanism coöperative with the screw to turn the platen while the line-spacing wheel is at rest, said mechanism comprising a shaft connected with the screw and extending through the line-spacing wheel and having on it means adapting it to be actuated by hand.

15. In a typewriting machine, the combination with the platen and a line-spacing wheel operative to rotate the platen, of a screw within the platen and mechanism cooperative with the screw to turn the platen while the line-spacing wheel is at rest, said mechanism comprising a shaft connected with the screw and extending outside of the platen and having on it means adapting it to be actuated by hand, the axes of the screw and shaft coinciding with that of the platen.

16. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, and a feather fixed in the line-spacing wheel and extending into the groove in said shaft.

17. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, a feather fixed in the line spacing wheel and extending into the groove in said shaft, and a finger wheel on said shaft.

18. In a typewriting machine, the combination with the platen, of a screw, a counterpart to engage the screw, and stops to limit the rotation of the platen in both directions.

19. In a typewriting machine, the combination with the platen, of a screw, a counterpart to engage the screw, and stops to limit the rotation of the platen in both directions, one of said stops being adjustable to change one of the limits of the platen's movement.

20. In a typewriting machine, the combination with the platen, of a line spacing wheel movable with and permitting an independent rotation of the platen, an axially movable screw, a counterpart to engage the screw, and a stop to limit the rotation of the platen.

21. In a typewriting machine, the combination with the platen, of a line spacing wheel movable with and permitting an independent rotation of the platen, an axially movable manually operated screw, a counterpart to engage the screw, and stops to limit the rotation of the platen.

22. In a typewriting machine, the combination with the platen, of a line spacing wheel movable with and permitting an independent rotation of the platen, an axially movable screw, a counterpart to engage the screw, and stops to limit the rotation of the platen, one of said stops being adjustable to change one of the limits of the platen's movement.

23. In a typewriting machine, the combination with the platen, a line spacing wheel movable with and permitting an independent rotation of the platen, of a manually actuated screw within the platen, a counterpart to engage the screw, and a stop to limit the rotation of the platen.

24. In a typewriting machine, the combination with the platen, of a line spacing wheel movable with and permitting an independent rotation of the platen, a screw within the. platen, a counterpart to engage the screw, and stops to limit the rotation of the platen in both directions.

25. In a typewriting machine, the combination with the platen, of a screw within the platen, a counterpart to engage the screw, and stops to limit the rotation of the platen in both directions, one of said stops being adjustable to change one of the limits of the platen's movement.

26. In a typewriting machine, the combination with the platen, of an axially movable screw having hand actuated means arranged outside of the platen, a counterpart affixed to the platen and engaging the screw, and a stop to limit the axial movement of the screw.

27. In a typewriting machine, the combination with the platen, of an axially movable screw, a counterpart affixed to the platen and engaging the screw, and stops to limit the axial movement of the screw in both directions and thus limit the rotation of the platen in both directions.

28. In a typewriting machine, the combination with the platen, of an axially movable screw, a counterpart affixed to the platen and engaging the screw, and stops to limit the axial movement of the screw in both directions, one of said stops being adjustable to change one of the limits of the screw's axial movement.

29. In a typewriting machine, the combination with the platen, of an axially movable screw, a counterpart affixed to the platen and engaging the screw, a shaft connected with the screw and movable therewith, and a stop on said shaft to limit the movement of the shaft and screw.

30. In a typewriting machine, the combination with the platen, of an axially movable screw, a counterpart affixed to the platen and engaging the screw, a shaft connected with the screw and movable therewith, and stops on said shaft to limit the axial movement of the screw in both directions.

31. In a typewriting machine, the combination with the platen, of an axially movable screw, a counterpart affixed to the platen and engaging the screw, a shaft connected with the screw and movable therewith, and stops on said shaft to limit the axial movement of the screw in both directions, one of said stops being adjustable to change one of the limits of the screw's axial movement.

32. In a typewriting machine, the combination with the platen, of an axially movable screw within the platen, a counterpart secured in the platen and engaging said screw, a shaft connected with the screw and axially movable therewith, and a stop on said shaft to limit the axial movement of the shaft and screw.

33. In a typewriting machine, the combination with the platen, of an axially movable screw within the platen, a counterpart secured in the platen and engaging said screw, a shaft connected with the screw and axially movable therewith, and stops on said shaft to limit the axial movement of the shaft and screw in both directions.

34. In a typewriting machine, the combination with the platen, of an axially movable screw within the platen, a counterpart secured in the platen and engaging said screw, a shaft connected with the screw and axially movable therewith, and stops on said shaft to limit the axial movement of the shaft and screw in both directions, one of said stops being adjustable to change one of the limits of the screw's axial movement.

35. In a typewriting machine, the combination with the platen, of an axially movable screw within the platen, a counterpart secured in the platen and engaging said screw, a shaft connected with the screw and extending outside of the platen frame, and a stop on said shaft arranged to act against the platen frame.

36. In a typewriting machine, the combination with the platen, of an axially movable screw within the platen, a counterpart secured in the platen and engaging said screw, a shaft connected with the screw and extending outside of the platen frame, and a stop on said shaft arranged to act against the platen frame, the stop being adjustable along said shaft.

37. In a typewriting machine, the combination with the platen and a line-spacing wheel operative to rotate the platen, of an axially movable screw within the platen, a counterpart secured in the platen and engaging the screw, a shaft connected with the screw and extending through the line-spacing wheel, the shaft being movable with the screw, and a stop on the shaft to limit the movement of the shaft.

38. In a typewriting machine, the combination with the platen and a line-spacing wheel operative to rotate the platen, of an axially movable screw within the platen, a counterpart secured in the platen and engaging the screw, a shaft connected with the screw and extending through the line-spacing wheel, the shaft being movable with the screw, and a stop on the shaft to limit the movement of the shaft, the stop being adjustable along said shaft.

39. In a typewriting machine, the combination with the platen and a line-spacing wheel operative to rotate the platen, of an axially movable screw within the platen, a counterpart secured in the platen and engaging the screw, a shaft connected with the screw and extending through the line-spacing wheel, the shaft being movable with the screw, and stops on the shaft to limit its movement, one of said stops being within and the other outside of the platen.

40. In a typewriting machine, the combination with the platen and a line-spacing wheel operative to rotate the platen, of an axially movable screw within the platen, a counterpart secured in the platen and engaging the screw, a shaft connected with the screw and extending through the line-spacing wheel, the shaft being movable with the screw, and stops on the shaft to limit its movement, one of said stops being within and the other outside of the platen and one of the stops being adjustable along said shaft.

41. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, the shaft being axially movable with the screw, a feather fixed in the line-spacing wheel and extending into said groove, and a stop on said shaft to limit the axial movement thereof.

42. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, the shaft being axially movable with the screw, a feather fixed in the line-spacing wheel and extending into said groove, and a stop on said shaft to limit the axial movement thereof, the stop being adjustable along said shaft.

43. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, the shaft being axially movable with the screw, a feather fixed in the line-spacing wheel and extending into said 44. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, the shaft being axially movable with the screw, a feather fixed in the line-spacing wheel and extending into said groove, and stops on said shaft to limit its movement, one of said stops being within and the other outside of the platen and one of the stops being adjustable along said shaft.

45. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, the shaft being axially movable with the screw, a feather fixed in the line-spacing wheel and extending into said groove, and a finger wheel on said shaft, forming a stop to limit the movement of the shaft.

46. In a typewriting machine, the combination with the platen, a line-spacing wheel operative to rotate the platen, and a detent engaging the line-spacing wheel, of an axially movable screw within the platen, a counterpart secured in the platen and engaging the screw, a grooved shaft connected with the screw and extending through the line-spacing wheel, the shaft being axially movable with the screw, a feather fixed in the line-spacing wheel and extending into said groove, and a finger wheel on said shaft, forming a stop to limit the movement of the shaft, said finger wheel being adjustable along the shaft.

47. In a typewriting machine, the combination with the platen, of an axially movable shaft having hand actuated means arranged outside of the platen, and mechanism coöperative with said shaft to rotate the platen.

48. In a typewriting machine, the combination with the platen, of a line spacing wheel movable with and permitting an independent rotation of the platen, an axially movable shaft, and mechanism coöperative therewith to rotate the platen, the axis of said shaft coinciding with that of the platen.

49. In a typewriting machine, the combination with the platen, of an axially movable shaft, and mechanism coöperative therewith to rotate the platen, the shaft extending from the interior of the platen to the exterior of the platen frame and provided with hand controlled means whereby it may be actuated.

50. In a typewriting machine, the combination with the platen, of an axially movable shaft, and mechanism coöperative therewith to rotate the platen, the shaft extending from the interior of the platen to the exterior of the platen frame and having on it a finger wheel.

51. In a typewriting machine, the combination with the platen, of an axially movable shaft having hand actuated means arranged outside of the platen, mechanism coöperative with said shaft to rotate the platen, and a stop to limit the axial movement of said shaft.

52. In a typewriting machine, the combination with the platen, of an axially movable shaft, mechanism coöperative therewith to rotate the platen in both directions, and stops to limit the axial movement of said shaft in both directions and thereby limit both the forward and backward rotation of the platen.

53. In a typewriting machine, the combination with the platen, of an axially movable shaft, mechanism coöperative therewith to rotate the platen, and stops to limit the axial movement of said shaft in both directions, one of the stops being adjustable along said shaft.

54. In a typewriting machine, the combination with the platen and a line spacing wheel operative to rotate the platen, of an axially movable shaft extending through the line-spacing wheel, and mechanism coöperative therewith to rotate the platen.

55. In a typewriting machine, the combination with the platen and a line-spacing wheel operative to rotate the platen, of an axially movable shaft extending through the line-spacing wheel, mechanism coöperative with said shaft to rotate the platen, and a stop to limit the axial movement of said shaft.

56. In a typewriting machine, the combination with the platen and a line-spacing wheel operative to rotate the platen, of an axially movable shaft extending through the line-spacing wheel, mechanism coöperative with the shaft to rotate the platen, and stops to limit the axial movement of said shaft in both directions.

57. In a typewriting machine, the combination with the platen and a line-spacing wheel operative to rotate the platen, of an axially movable shaft extending through the line-spacing wheel, mechanism coöperative with said shaft to rotate the platen, and stops to limit the axial movement of said shaft in both directions, one of the stops being adjustable along said shaft.

58. In a typewriting machine, the combination with the platen and a line-spacing wheel operative to rotate the platen, of an axially movable shaft extending through the line spacing wheel, mechanism coöperative with the shaft to rotate the platen, and stops to limit the axial movement of said shaft in both directions, one of the stops being a finger wheel adjustable along said shaft.

59. In a typewriting machine, the combination with the platen, of an axially movable shaft, and mechanism coöperative therewith to rotate the platen, said shaft having on it a scale indicating the movement to be imparted to the shaft to produce a desired movement of the platen.

60. In a typewriting machine, the combination with the platen, of an axially movable shaft, and mechanism coöperative therewith to rotate the platen, the axis of said shaft coinciding with that of the platen and said shaft having on it a scale indicating the movement to be imparted to the shaft to produce a desired movement of the platen.

61. In a typewriting machine, the combination with the platen, of an axially movable shaft, and mechanism coöperative therewith to rotate the platen, the shaft extending from the interior of the platen to the exterior of the platen frame and having on it a scale indicating the movement to be imparted to the shaft to produce a desired movement of the platen.

62. In a typewriting machine, the combination with the platen, of an axially movable shaft and mechanism coöperative therewith to rotate the platen, the shaft extending from the interior of the platen to the exterior of the platen frame and having on it a finger wheel and a scale indicating the movement to be imparted to the shaft to produce a desired movement of the platen.

63. In a typewriting machine, the combination with the platen, of a shaft, mechanism connecting the shaft with the platen, the shaft being axially movable and the platen being movable on its axis simultaneously, and the shaft having on it a scale indicating the movement to be imparted to the shaft to produce a desired movement of the platen.

64. In a typewriting machine, the combination with the platen, of a shaft, and mechanism connecting the shaft with the platen, the axis of the shaft coinciding with that of the platen, and the shaft being axially movable and the platen being movable on its axis simultaneously, and the shaft having on it a scale indicating the movement to be imparted to the shaft to produce a desired movement of the platen.

65. In a typewriting machine, the combination with the platen, of a shaft and mechanism connecting the shaft with the platen, the shaft extending from the interior of the platen to the exterior of the platen frame and the shaft being axially movable and the platen being movable on its axis simultaneously, and the shaft having on it a scale indicating the movement to be imparted to the shaft to produce a desired movement of the platen.

Signed at the borough of Manhattan, city of New York, in the county of New York, and State of New York, this 16th day of May A. D. 1906.

ALLIN W. HEWITT.

Witnesses:
E. M. WELLS,
M. F. HANNWEBER.